United States Patent [19]
Oh

[11] Patent Number: 6,038,670
[45] Date of Patent: Mar. 14, 2000

[54] COMPUTER DISPLAY SWITCHING CIRCUIT AND METHOD THEREOF

[75] Inventor: Jae-choeul Oh, Suwon, Rep. of Korea

[73] Assignee: SamSung Electronics Co., Ltd., Suwon, Rep. of Korea

[21] Appl. No.: 08/999,195

[22] Filed: Dec. 19, 1997

[30] Foreign Application Priority Data

Aug. 21, 1996 [KR] Rep. of Korea ............. 96-69870

[51] Int. Cl.$^7$ ............................................ G06F 1/00
[52] U.S. Cl. ................................................. 713/300
[58] Field of Search ..................... 713/300–340

[56] References Cited

U.S. PATENT DOCUMENTS

| | | |
|---|---|---|
| 4,839,837 | 6/1989 | Chang . |
| 4,852,498 | 8/1989 | Judd . |
| 4,860,246 | 8/1989 | Inoue . |
| 4,903,222 | 2/1990 | Carter et al. . |
| 4,922,448 | 5/1990 | Kunieda et al. ................. 364/900 |
| 5,138,305 | 8/1992 | Tomiyasu ........................ 340/717 |
| 5,184,314 | 2/1993 | Kelley et al. . |
| 5,200,913 | 4/1993 | Hawkins et al. . |
| 5,235,532 | 8/1993 | Sugino . |
| 5,267,123 | 11/1993 | Boothroyd et al. . |
| 5,319,582 | 6/1994 | Ma . |
| 5,335,168 | 8/1994 | Walker . |
| 5,337,212 | 8/1994 | Bartlett et al. . |
| 5,341,316 | 8/1994 | Nishigaki ....................... 364/709.12 |
| 5,375,245 | 12/1994 | Solhjell et al. ................ 395/750 |
| 5,459,833 | 10/1995 | Nishizawa . |
| 5,481,732 | 1/1996 | Shahbazi . |
| 5,483,250 | 1/1996 | Herrick . |
| 5,511,205 | 4/1996 | Kannan et al. ................. 395/750 |
| 5,537,650 | 7/1996 | West et al. ...................... 395/750 |
| 5,548,765 | 8/1996 | Tsunoda et al. . |
| 5,613,135 | 3/1997 | Sakai et al. ..................... 395/800 |
| 5,721,935 | 2/1998 | DeSchepper et al. .......... 395/750 |
| 5,845,137 | 12/1998 | Tanaka ......................... 395/750.05 |

FOREIGN PATENT DOCUMENTS 93-8573  5/1993  Rep. of Korea .

Primary Examiner—Ayaz R. Sheikh
Assistant Examiner—Jigar Pancholi
Attorney, Agent, or Firm—Robert E. Bushnell, Esq.

[57] ABSTRACT

A computer display switching circuit employed in a computer system having an external display and a notebook computer having an internal display includes an external display sensor for checking the state of the external display connector to sense whether the external display is receiving an image signal, and an image signal output controller for controlling an image signal output according to the state sensed by the external display sensor. Accordingly, power to the external display connected to the notebook computer is turned on or off according to the opening and closing of the cover of the internal display of the notebook computer so as to avoid the need for a conventional keyboard hot key. Also, in the case that only an external display is used, the internal display is powered down. Therefore, unnecessary power consumption by the internal display is prevented.

15 Claims, 5 Drawing Sheets

COMPUTER DISPLAY SWITCHING CIRCUIT AND METHOD THEREOF

CLAIM OF PRIORITY

This application makes reference to, incorporates the same herein, and claims all benefits accruing under 35 U.S.C. §119 from an application for COMPUTER DISPLAY SWITCHING CIRCUIT AND METHOD THEREOF earlier filed in the Korean Industrial Property Office on the 21st of December 1996 and there duly assigned Serial No. 69870/1996.

BACKGROUND OF THE INVENTION

1. Technical Field

The present invention relates to a computer display switching circuit and a method thereof and, more particularly, to a computer display switching circuit which detects the connection of an external cathode ray tube (CRT) and the opening and closing of a liquid crystal display (LCD) cover and automatically switches a display, and a method thereof.

2. Related Art

In general, a notebook computer includes a body composed of a computer system and a key board, and a cover connected to the body. An LCD display device is installed inside the cover, and a connector to an external CRT monitor is installed in the body.

As explained below, the operation of the notebook computer is such that it is difficult or inconvenient to maintain the external CRT monitor in the "power-on" state when the cover of the LCD display device is closed. That is to say, when the cover to the LCD display device is closed, the CRT monitor is automatically powered down, and it is only by operation of a hot key on the keyboard that the user is able to maintain or restore the external CRT monitor to its "power-on" state.

In addition, the notebook computer operates in such a manner that, when the computer is not in use, system power remains on. As a result, power is unnecessarily consumed by the notebook computer.

Therefore, there is a need for development of a display switching circuit for a computer system and a related method in which selection of a display is automatically switched without operating a keyboard, and in which unnecessary power consumption by the notebook computer is avoided.

The following patents are considered to be representative of the prior art, but are burdened by the disadvantages discussed above:

U.S. Pat. No. 5,483,250 to Herrick entitled Projection Display System for a Laptop Computer or a Notebook Computer; U.S. Pat. No. 5,481,732 to Shahbazi entitled CRT Monitor Power Control Unit; U.S. Pat. No. 5,548,765 to Tsunoda, et al. entitled Power Saving Display Subsystem for Portable Computers; U.S. Pat. No. 5,459,833 to Nishizawa entitled Display Control System; U.S. Pat. No. 5,337,212 to Barlett, et al. entitled Flip Screen for Notebook Computer; U.S. Pat. No. 5,319,582 to Ma entitled Detachable Portable Personal Computer; U.S. Pat. No. 5,335,168 to Walker entitled Computer System with Power-down Mode for Monitor, U.S. Pat. No. 5,184,314 to Kelly, et al. entitled Mobile Data Processing and Communications System with Removable Portable Computer, U.S. Pat. No. 5,267,123 to Boothroyd, et al. entitled Case for Portable Computer Having Display Accessible When Lid Is Closed over the Keyboard; U.S. Pat. No. 5,235,532 to Sugino entitled Information Processing Apparatus for Performing Operations in Response to the Opening and the Closing of a Cover Thereof; U.S. Pat. No. 5,200,913 to Hawkins, et al. entitled Combination Laptop and Pad Computer; U.S. Pat. No. 4,852,498 to Judd entitled Lap Top Computer Work Station; U.S. Pat. No. 4,839,837 to Chang entitled Three Layered Laptop Computer; U.S. Pat. No. 4,860,246 to Inoue entitled Emulation Device for Driving a LCD with a CRT Display; and U.S. Pat. No. 4,903,222 to Carter, et al. entitled Arrangement of Components in a Laptop Computer System.

SUMMARY OF THE INVENTION

It is an object of the present invention to provide a display switching circuit for a computer system in which selection of a display is automatically switched without operating a keyboard, and unnecessary power consumption while the computer is not being used can be prevented, and a method thereof.

To accomplish the above object of the present invention, there is provided a display switching circuit for a computer system, employed in a computer system having an external display and a notebook computer including an internal display, comprising: an external display sensor for checking the state of the external display connector to sense whether the external display is receiving an image signal; and an image signal output controller for controlling an image signal output according to the state sensed by the external display sensor.

Also, to accomplish the above object of the present invention, there is provided a display switching method for a computer system, employed in a notebook computer including an internal display, comprising the steps of:

a) judging or determining whether an external display can display; and b) outputting or blocking an image signal to or from the external display according to the result determined in step a) and a state of the system.

Accordingly, the power on or off state of an external display monitor connected to a notebook computer is maintained according to the opening and closing of the cover of the internal display of the notebook computer, and without the operation of a hot key on the keyboard. Also, in the case that only an external display is used, the plane display is powered down. Therefore, unnecessary power consumption by the internal display is prevented.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

An internal system of a notebook computer may be used as a computer display switching circuit according to the present invention. Accordingly, embodiments will be described using the internal system of the notebook computer.

Figure 1:
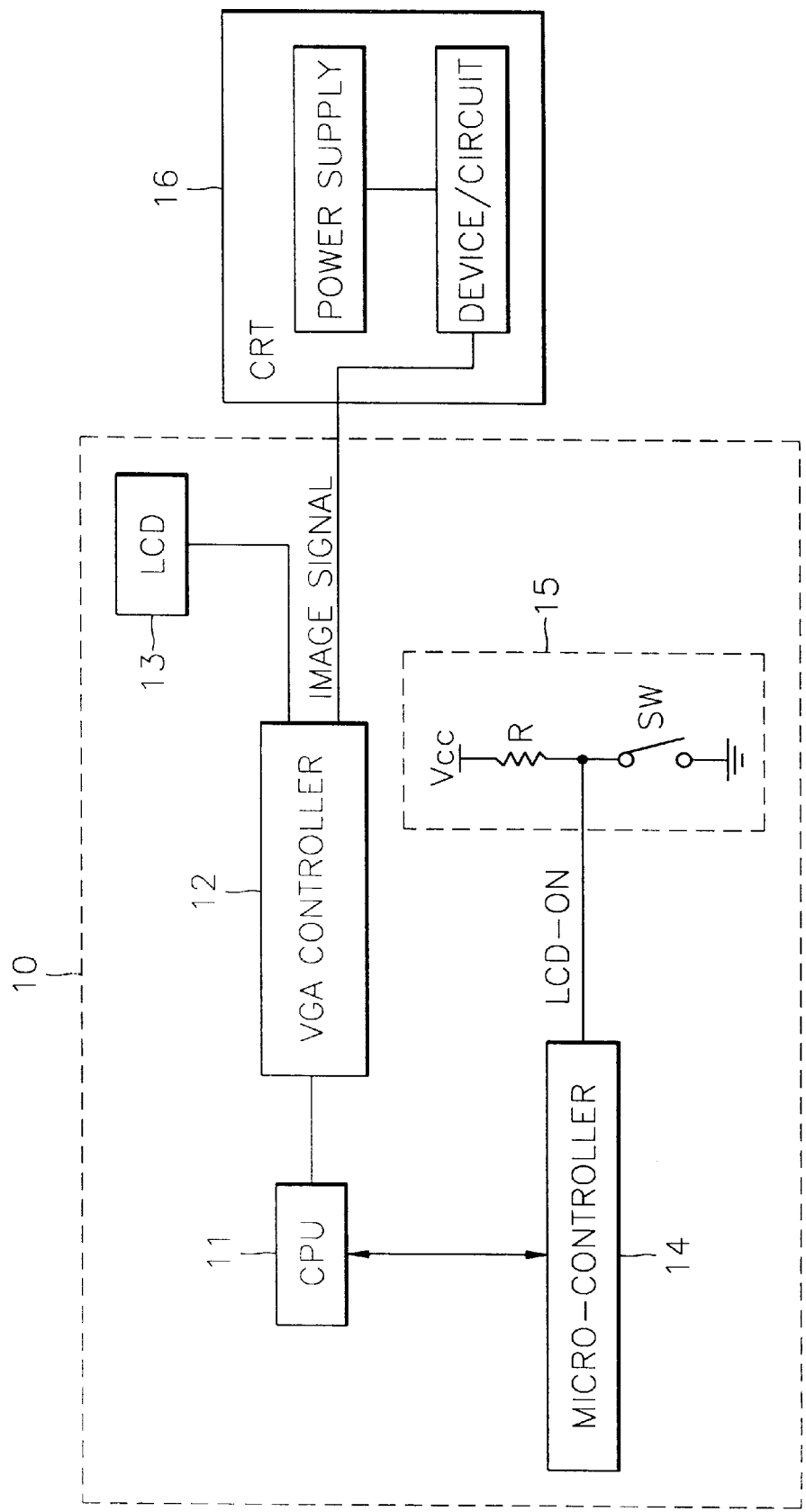
FIG. 1 is a block diagram of the connection of a notebook computer to an external CRT monitor.

FIG. 1 is a block diagram of the connection between a notebook computer and an external CRT monitor.

Referring to FIG. 1, the notebook computer 10 includes a central processing unit (CPU) 11 for controlling the total system, a video graphics array (VGA) controller 12 for controlling the computer graphics, an LCD 13 which can be opened and closed, a micro-controller 14 for detecting an input from the mouse or keyboard and a memory during initial booting, and an external display sensor 15 for generating on/off signals according to the opening and closing of the LCD 13. An external CRT monitor 16 is connected to the notebook computer 10.

In the above notebook computer, when the internal LCD 13 and the external CRT monitor 16 are switched on/off, a desired state is obtained by pressing a hot key on the keyboard. That is, when the cover of the LCD 13 is closed, both the LCD 13 and the CRT monitor 16 are powered down, even though the external CRT monitor 16 connected thereto is in a power on state, so that the CRT monitor 16 cannot be used.

In order to use only the external CRT monitor 16 without the LCD 13, the operation of the hot key on the keyboard is required. Also, in the case that the computer is not being used, the system power remains on, thereby consuming unnecessary power.

Figure 2:
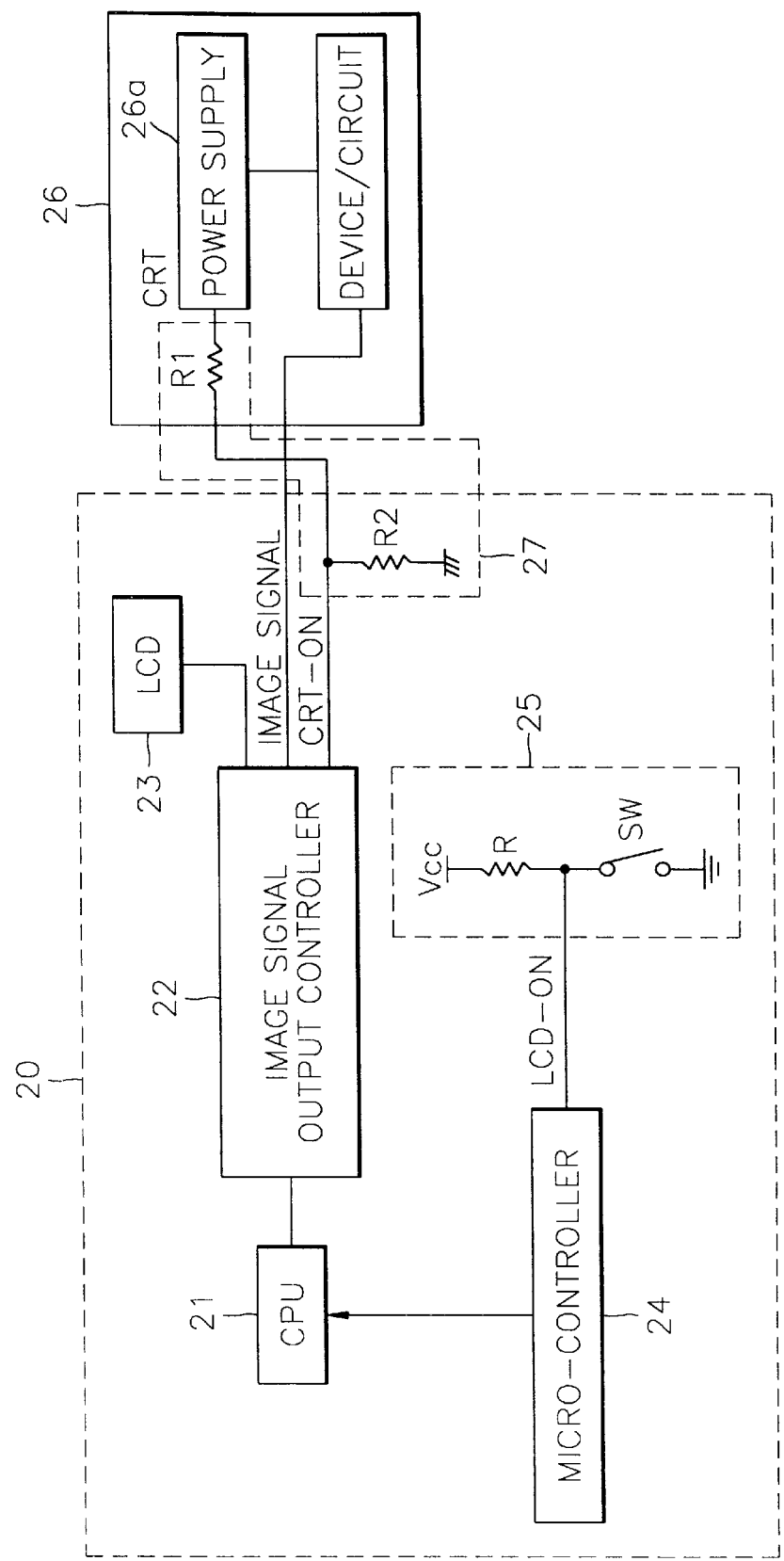
FIG. 2 is a block diagram of a display switching circuit for a computer system according to an embodiment of the present invention.

Referring to FIG. 2, the notebook computer 20 includes a CPU 21 for controlling the total system, an external display sensor 27 for sensing the connection of an external display 26 to determine whether the external display 26 (i.e., a CRT) can receive an image signal, an image signal output controller 22 for controlling an image signal output according to the sensing state of the external display sensor 27, an opening and closing internal display 23 (i.e., an LCD) for displaying image information on a screen according to a control command from the image signal output controller 22, an internal display sensor 25 for outputting a predetermined signal depending on the state of a switch SW which is operated by opening or closing the internal display 23, and a micro-controller 24 for receiving signals from the internal display sensor 25 and for transmitting corresponding interrupt signals to the CPU 21.

Here, the image signal output controller 22 is a video controller, and the external display sensor 27 includes a first resistor R1 and a second resistor R2. The first resistor R1 is installed in the external display 26, and is connected in series between the image signal output controller 22 in the notebook computer 20 and a power supply 26a in the external display 26. The second resistor R2 is connected between the line joining the first resistor R1 to the image signal output controller 22 and ground (i.e., a predetermined portion of the inside of the notebook computer 20). When the power supply 26a of the external display 26 is turned on, the first and second resistors R1 and R2 have resistances defining a predetermined ratio such that the line connecting the first resistor R1 to the image signal output controller 22 becomes logic high.

Figure 3:
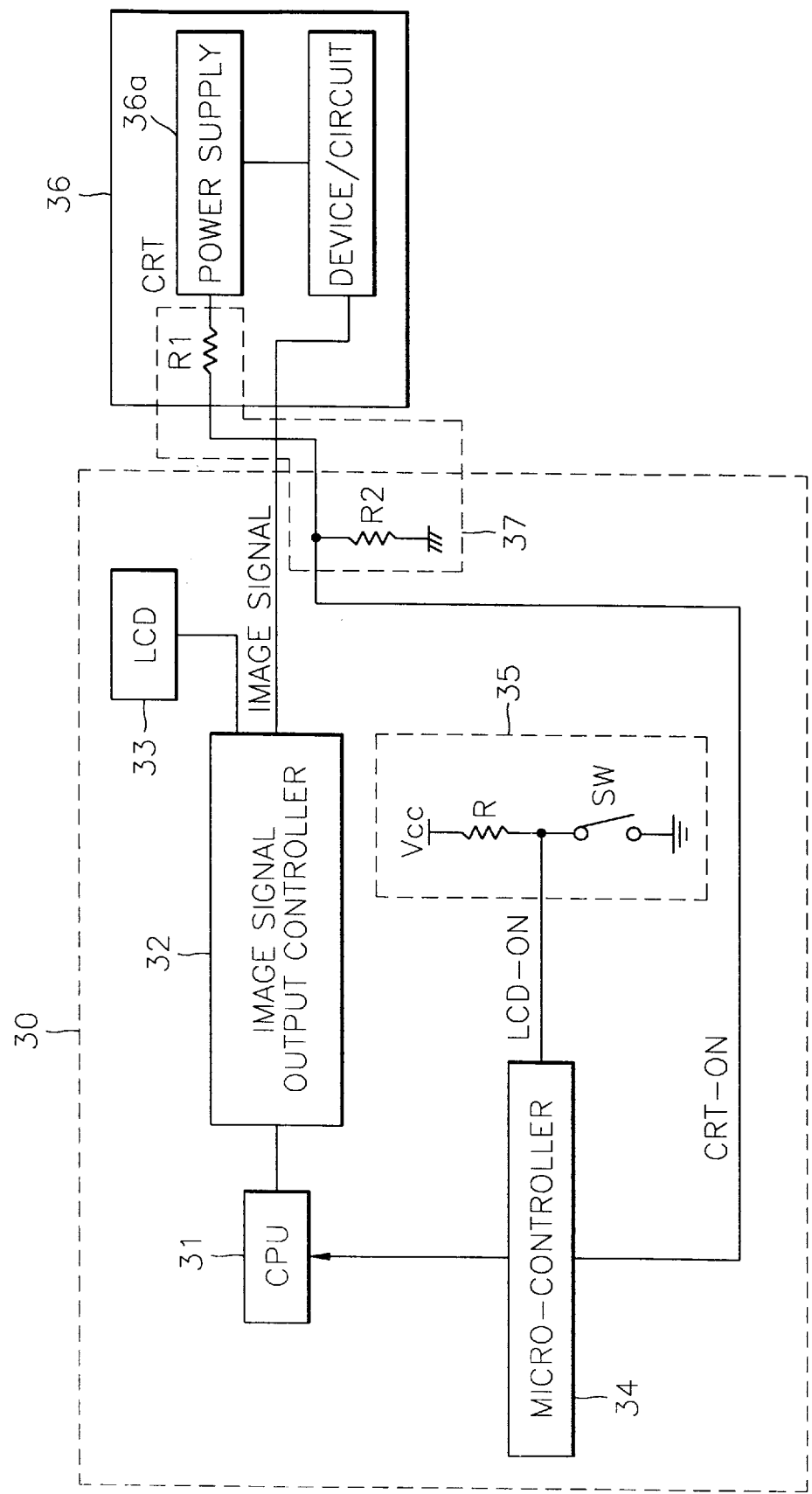
FIG. 3 is a block diagram of a display switching circuit for a computer system according to a second embodiment of the present invention.

The structure of the second embodiment, shown in FIG. 3, is identical to that of the first embodiment of FIG. 2, except that the external display sensor 37 is connected to micro-controller 34 inside the notebook computer 30.

In the second embodiment, the external display sensor 37 includes a first resistor R1 and a second resistor R2. The first resistor R1 is installed in the external display 36, and is connected in series between the micro-controller 34 in the notebook computer 30 and the power supply 36a in the external display 36. The second resistor R2 is connected between the line joining the first resistor R1 to the micro-controller 34 and ground (i.e., a predetermined portion of the inside of the notebook computer 30). Also, when the power supply 36a of the external display 36 is turned on, the first and second resistors R1 and R2 have resistances defining a predetermined ratio such that a line connecting the first resistor R1 to the micro-controller 34 becomes logic high.

The first and second embodiments function in similar ways, and achieve the same effect. However, the second embodiment is advantageous in that video controllers fabricated by various manufacturers may be used for the image signal output controller 32.

Figure 4:
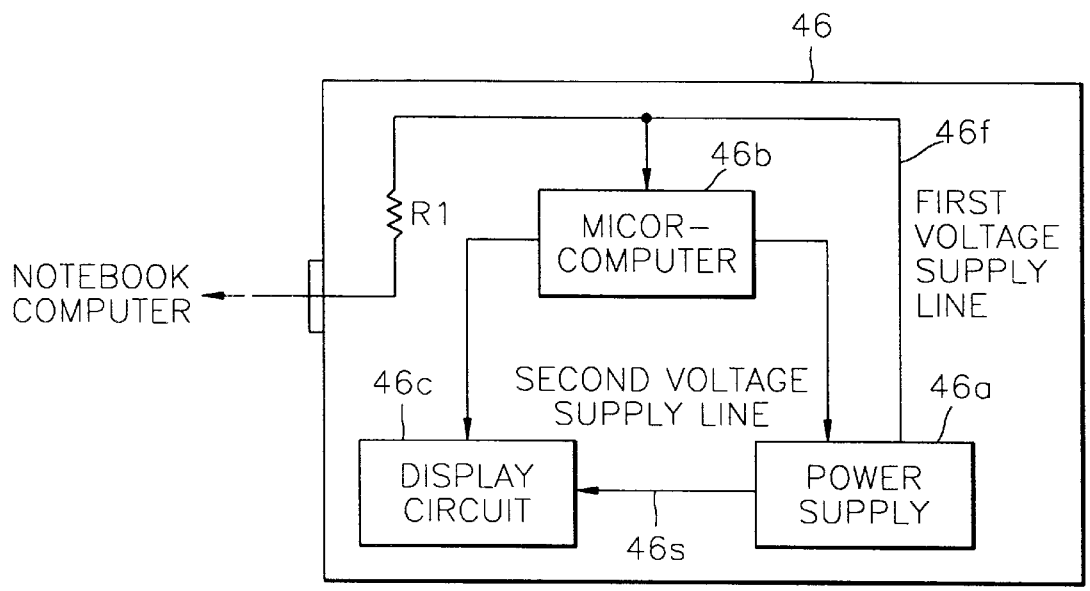
FIG. 4 is a block diagram showing an example of the internal structure of an external CRT monitor employing a display switching circuit for a computer system according to the present invention.

Referring to FIG. 4, a first voltage supply line 46f, which is always in the power-supplied state, is connected to a microcomputer 46b in a CRT monitor 46 of a notebook computer to indicate when the CRT monitor 46 is connected.

Figure 5:
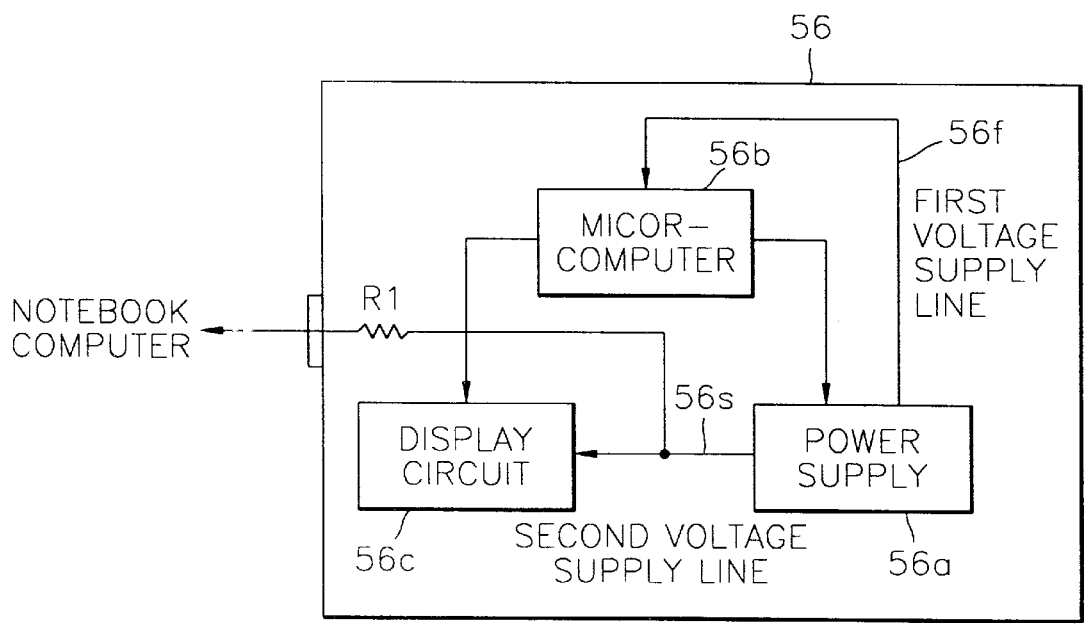
FIG. 5 is a block diagram showing another example of the internal structure of an external CRT monitor employing a display switching circuit for a computer system according to the present invention.

Referring to FIG. 5, a first voltage supply line 56f, which is always in the power-supplied state, is connected to a microcomputer 56b in a CRT monitor 56. A second voltage supply line 56s, which is turned on/off according to a power mode dictated by the power switch (not shown) of the CRT monitor 56, is connected to the notebook computer via resistor R1. In FIGS. 4 and 5, reference numerals 46a and 56a indicate a power supply, reference numerals 46c and 56c indicate a display circuit, and reference numeral 46s and 56s indicate a second voltage supply line.

The operation of the above-described computer display switching circuit according to the present invention will be described briefly.

As shown in FIG. 2, when the external CRT display 26 is connected to the notebook computer 20, a line connecting the external display 26 to the notebook computer 20 becomes active or high. Accordingly, a predetermined interrupt is applied to the image signal output controller 22, and the image signal output controller 22 outputs an image signal to the external display 26.

Meanwhile, instead of the previously described method involving use of a hot key of an external or internal keyboard connected to the notebook computer, the following method is used. When the cover of the internal display LCD 23 is closed, a switch SW of the internal display sensor 25 is actuated, and thus a low signal (a cover closed signal) is received by the micro-controller 24. Accordingly, the micro-controller 24 outputs to the CPU 21 an interrupt corresponding to the closing of the cover of the internal display 23, and the CPU 21 checks whether the external display 26 is turned on through the image signal output controller 22. At this time, when the external display 26 is turned on, the CPU 21 prevents the image signal output controller 22 from displaying image information on the internal display 23, and displays the image only on the external display 26. When the external display 26 is not turned on, the CPU 21 initiates a power down mode to preclude operation of the system.

The operation of the second embodiment of FIG. 3 is identical to that of the first embodiment of FIG. 2, except that the micro-controller 34 checks the status of the external display 36.

Also, a display switching method according to the above-described computer display switching circuit will be described with reference to FIGS. 2 and 6.

Figure 6:
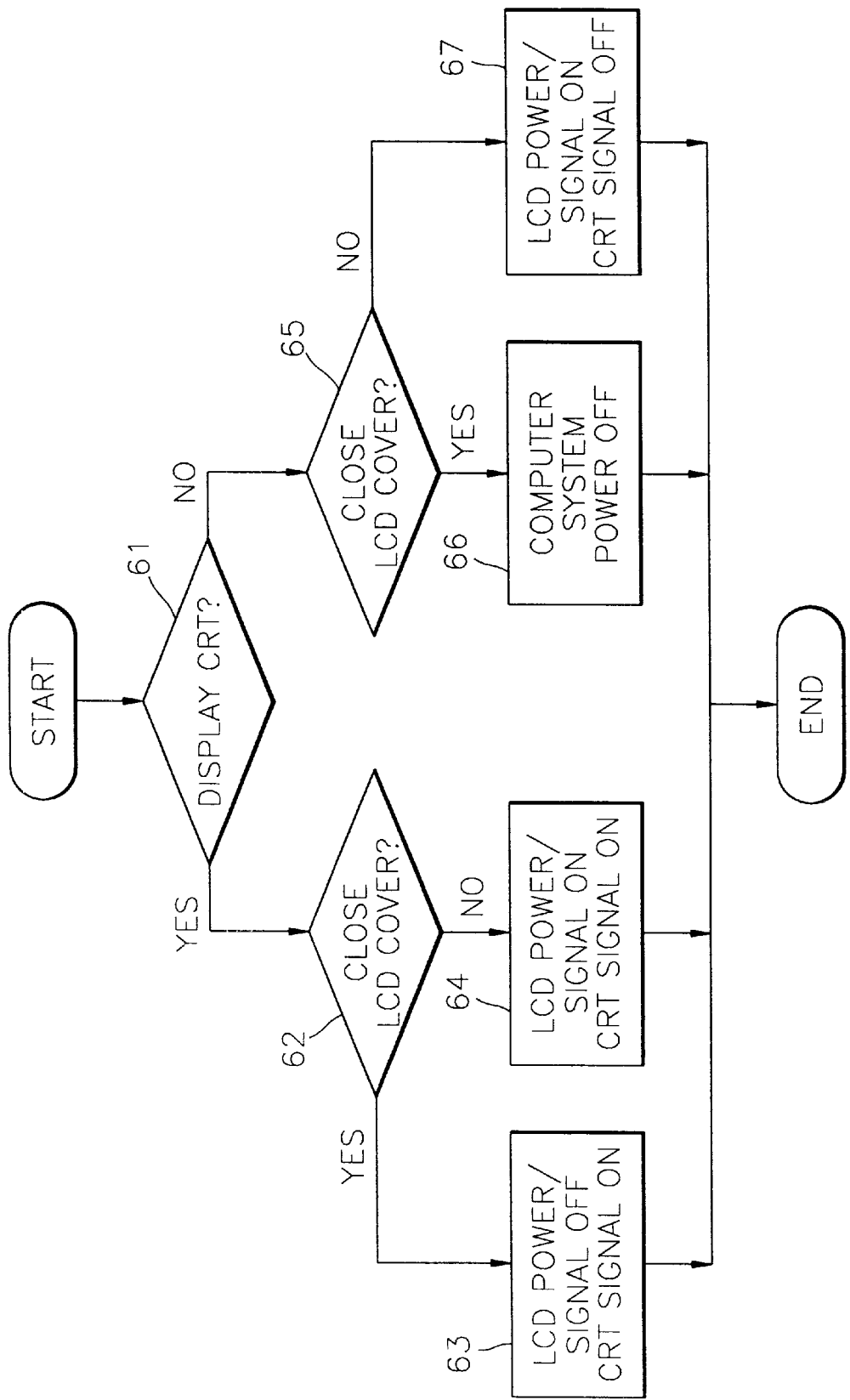
FIG. 6 is a flowchart representing a display switching method for a computer system according to the present invention.

Referring to FIGS. 2 and 6, when power is applied to the notebook computer 20 to drive the system, the CPU 21 determines in step 61 whether the external CRT display 26 is connected to the notebook computer 20 (i.e., can display). If the external display 26 is connected to the notebook computer 20, a further determination is made as to whether the power to the external display 26 is turned on. For example, in the case of employing the CRT monitor 46 of FIG. 4, the CPU 21 determines whether the external display 46 is connected to the notebook computer. In the case of employing the CRT monitor 56 of FIG. 5, the CPU 21 determines whether the power to the external display 56 is turned on. The above-described steps are executed by programs stored in the CPU 21 during fabrication of the system.

When the display 26 can display, as determined in step 61, it is determined in step 62 whether the cover of the internal display (LCD) 23 is closed. When the cover is closed, the internal display 23 is turned off, and the image signal to the external display 26 is turned on (step 63). When the cover of the plane display 23 is not closed, as determined in step 62, the power and image signal to the internal display 23 and the image signal to the external display 26 are turned on (step 64).

When the external display 26 cannot display, as determined in step 61, it is determined whether the cover of the internal display 23 is closed (step 65). When the cover of the internal display 23 is closed, the computer system is turned off (step 66). When the cover of the internal display 23 is not closed, as determined in step 65, the power and image signal of the internal display 23 are turned on, and the external display image signal is turned off (step 67).

The above-described programs are automatically performed according to opening and closing of the cover of the LCD or internal display 23, and thus the desired display is automatically switched on. At this time, no power is applied to the unused display, or to the computer system when no display is used.

As described above, according to a computer display switching circuit of the present invention and a method thereof, the power on/off state of an external CRT display connected to a notebook computer is maintained according to the opening and closing of a cover of the internal LCD display of the notebook computer so as to avoid the need for a conventional hot key on the keyboard. Also, in the case that only an external display is used, the LCD is powered down. Therefore, unnecessary power consumption by the LCD is prevented.

What is claimed is:

1. A display switching circuit employed in a computer system having an external display and a notebook computer including an internal display, comprising:

external display sensor means for checking a state of said external display to sense whether said external display is receiving an image signal; and image signal output controller means connected to said external display sensor means for controlling an image signal output according to the state checked by said external display sensor means;

wherein a first resistor is installed in the external display and is connected in series between the image signal output controller means and the external display and wherein said external display sensor means comprises a second resistor connected between a line joining said first resistor to said image signal output controller means and electrical ground.

2. The display switching circuit of claim 1, wherein said first and second resistors have resistances defining a predetermined ratio such that, when a power supply of the external display is turned on, the line connecting said first resistor to said image signal output controller means becomes logic high.

3. The display switching circuit of claim 1, further comprising an internal display sensor means for sensing opening and closing of the internal display, and micro-controller means for receiving signals from said internal display sensor means so as to transmit corresponding interrupt signals to the notebook computer.

4. The display switching circuit of claim 3, wherein said image signal output controller means comprises a video controller.

5. The display switching circuit of claim 1, wherein said image signal output controller means comprises a video controller.

6. A display switching method for a computer system employed in a notebook computer including an internal display, comprising the steps of:

(a) determining whether an external display is connected to the notebook computer; and (b) selectively outputting an image signal to the external display and blocking an image signal from the external display in accordance with a result of said determining step (a) and a state of said system;

wherein step (b) comprises determining whether a cover of the internal display is closed or open when the external display is connected to the notebook computer: and wherein the power and an operation mode signal of the internal display and an operation mode signal of the external display are all turned on when it is determined that the cover of the internal display is open when the external display is connected to the notebook computer.

7. The method of claim 6, wherein step (b) further comprises the step of:

turning off the power and the operation mode signal of the internal display, and turning on the operation mode signal of the external display, when the cover of the internal display is determined to be closed.

8. A display switching method for a computer system employed in a notebook computer including an internal display, comprising the steps of:

(a) determining whether an external display is connected to the notebook computer; and (b) selectively outputting an image signal to the external display and blocking an image signal from the external display in accordance with a result of said determining step (a) and a state of said system:

wherein step (b) comprises the steps of:

(b-1) determining whether a cover of the internal display is closed when the external display is not connected to the notebook computer; and (b-2) turning off total power to the computer system when the cover of the internal display is determined to be closed.

9. The method of claim 8, wherein, when step (b-1) determines that the cover of the internal display is not closed, the power and an operation mode signal of the internal display are turned on, and an operation mode signal of the external display is turned off.

10. A display switching method for a computer system employed in a notebook computer which includes an internal display, comprising the steps of:
   (a) determining whether an external display is displaying data and whether a cover of said internal display is closed;
   (b) maintaining power input to said external display when said external display is displaying data and turning off power to said external display when said external display is not displaying data;
   (c) maintaining power to said internal display when said cover of said internal display is not closed and turning off power to said internal display when said cover of said internal display is closed; and
   (d) turning off power to said computer system when said external display is not displaying data and said cover of said internal display is closed.

11. The display switching circuit of claim 1, wherein the first resistor is connected to a power supply in the external display.

12. A display switching method for a computer system employed in a notebook computer including an internal display, comprising the steps of:
   (a) determining whether an external display is connected to the notebook computer; and
   (b) determining whether a cover of the internal display is closed or open when the external display is connected to the notebook computer;
   wherein the power and an operation mode signal of the internal display and the operation mode signal of the external display are all turned on when it is determined that the cover of the internal display is open when the external display is connected to the notebook computer.

13. The method of claim 12, further comprising the step of turning off power and the operation mode signal of the internal display, and turning on the operation mode signal of the external display, when the cover of the internal display is determined to be closed.

14. The method of claim 12, further comprising the steps of:
   (c) determining whether a cover of the internal display is closed when the external display is not connected to the notebook computer; and
   (d) turning off total power to the computer system when the cover of the internal display is determined to be closed.

15. The method of claim 14, wherein, when step (c) determines that the cover of the internal display is not closed, the power and the operation mode signal of the internal display are turned on, and the operation mode signal of the external display is turned off.

* * * * *